United States Patent [19]
Thomas

[11] 4,161,756
[45] Jul. 17, 1979

[54] CONTROL SYSTEM FOR VARIFOCAL OBJECTIVE

[75] Inventor: Otto Thomas, Bad Kreuznach, Fed. Rep. of Germany

[73] Assignee: Jos. Schneider & Co. Optische Werke, Bad Kreuznach, Fed. Rep. of Germany

[21] Appl. No.: 801,017

[22] Filed: May 26, 1977

Related U.S. Application Data

[63] Continuation-in-part of Ser. No. 778,933, Mar. 18, 1977, abandoned.

[30] Foreign Application Priority Data

Mar. 19, 1976 [DE] Fed. Rep. of Germany ....... 2611639

[51] Int. Cl.$^2$ .................... G02B 7/11; G02B 15/14
[52] U.S. Cl. ................................. 358/225; 350/44; 350/187; 352/140; 358/227
[58] Field of Search ................ 358/225, 227; 352/140; 350/41, 44, 42, 43, 184, 186, 187

[56] References Cited

U.S. PATENT DOCUMENTS

| | | | |
|---|---|---|---|
| 3,283,231 | 11/1966 | Askew | 358/227 X |
| 3,400,212 | 9/1968 | Plummer | 358/225 |
| 3,548,731 | 12/1970 | Barr | 350/187 |

FOREIGN PATENT DOCUMENTS

2546455 4/1976 Fed. Rep. of Germany.

Primary Examiner—Robert L. Richardson
Attorney, Agent, or Firm—Karl F. Ross

[57] ABSTRACT

The correlated positions of two axially shiftable components of a varifocal objective, i.e., a variator and a compensator, throughout a zoom range are stored in a memory from which they can be read out to control respective drives during a zooming operation. The readout rate is determined by a speed selector which sets a frequency for the pulsing of a control unit that scans successive memory addresses. The memory may also contain data for focusing control, either through axial adjustment of a front component of the objective or through modification of the positional correlation of the two shiftable components, as well as for an adjustment of a diaphragm with changes in the overall focal length.

10 Claims, 6 Drawing Figures

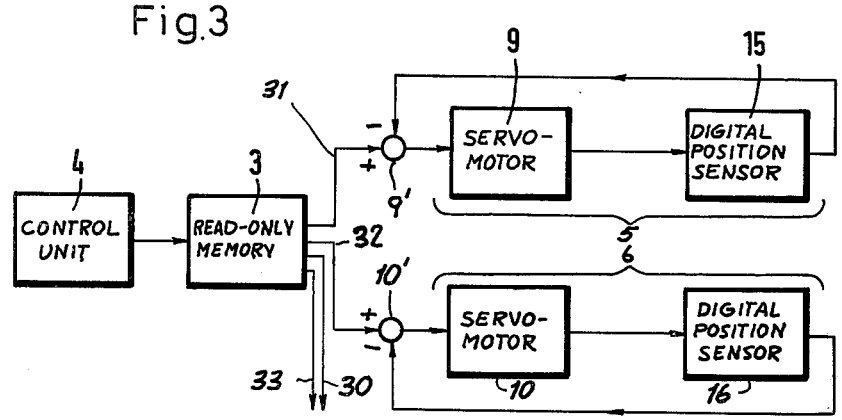
Fig. 3
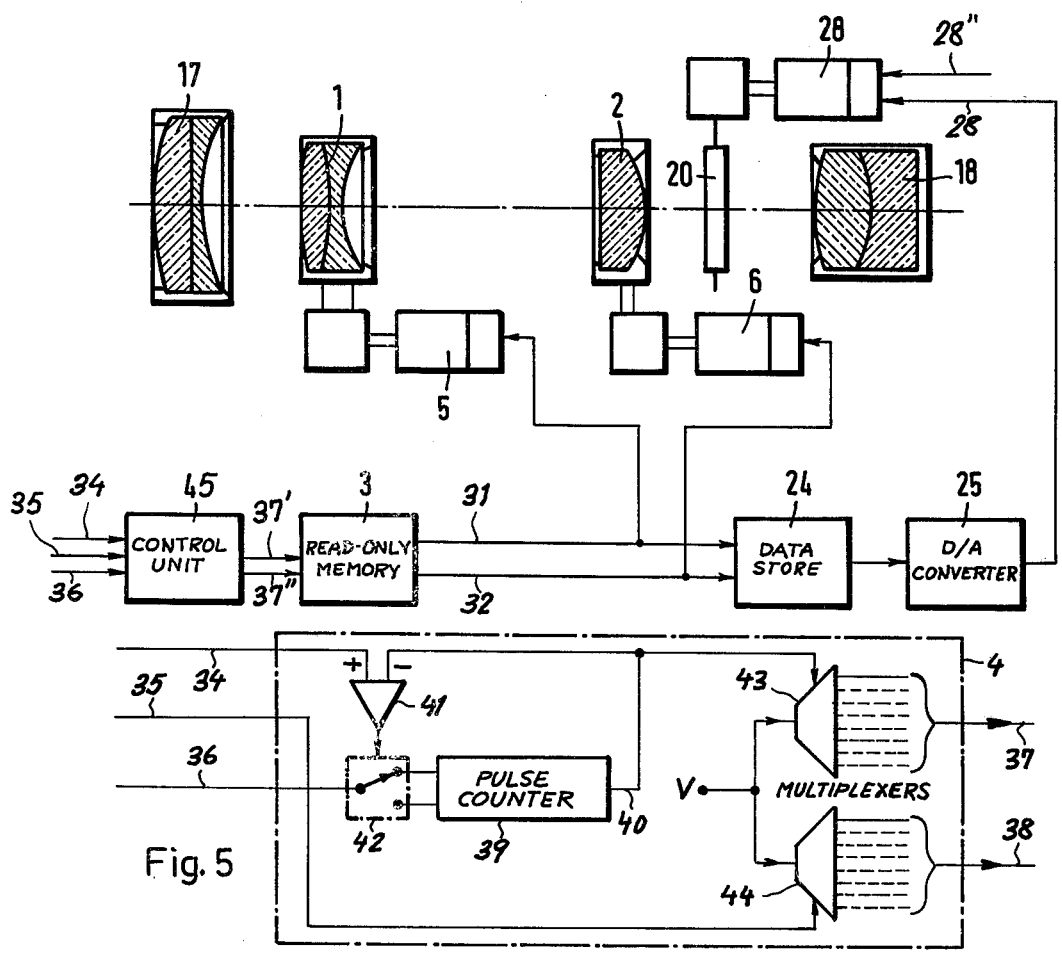
Fig. 4
Fig. 5

CONTROL SYSTEM FOR VARIFOCAL OBJECTIVE

CROSS-REFERENCE TO RELATED APPLICATION

This is a continuation-in-part of my application Ser. No. 778,933 filed 18, Mar. 1977 and now abandoned.

FIELD OF THE INVENTION

My present invention relates to a system for the control of a varifocal or zoom objective in an optical system such as a photographic, cinematographic or television camera or a copier.

BACKGROUND OF THE INVENTION

Conventional varifocal objectives comprise several (usually four) components of which two, generally the second and the third one, are axially shiftable to vary the overall focal length. The first of these axially shiftable components, termed a variator, determines that overall focal length whereas the second one, termed a compensator, maintains the position of the image plane constant throughout the zoom range. Thus, the positions of these shiftable and usually negatively refracting components are correlated in a predetermined manner according to a nonlinear law of relative displacement. Frequently, the objective also has a (usually positively refracting) front component which is limitedly axially adjustable, or includes an axially adjustable lens member, for focusing purposes. Alternatively, focusing (i.e. a change in the object distance) can also be carried out by modifying the relative position of the axially shiftable components used for zooming, yet this is more complicated since the extent of the supplemental shift required for focusing varies with the selected overall focal length.

In commonly owned U.S. Pat. No. 4,008,951 there has been disclosed a control mechanism in which the position of the second shiftable component, i.e., the compensator, is changed in response to stepping pulses generated upon the displacement of the first shiftable component, i.e., the variator, to maintain the requisite positional correlation of the two components.

A somewhat similar system has been described in German published specification No. 2,410,744 and corresponding U.S. Pat. No. 4,043,642 wherein the variator and the compensator are provided with respective position sensors working into a computer which sends corrective signals to the compensator drive for establishing the proper correlation. The operation of the computer may be modified to focus the objective upon an object located at a certain distance therefrom. The intervention of a computer in the positioning of the compensator introduces a certain delay into the adjustment of the compensator, thereby limiting the speed of the zooming operation. This delay, and the complexity of the computer, is aggravated if focusing is to be performed by modifying the positional correlation of the two shiftable components.

OBJECTS OF THE INVENTION

The general object of my present invention, therefore, is to provide a simplified control system for the purpose set forth.

Another object is to provide a control system which can be realized at moderate cost but whose sophistication can be increased at will for greater precision and/or a larger number of adjustment positions.

SUMMARY OF THE INVENTION

In accordance with my present invention, the correlated positional data for the two axially shiftable zooming components of a varifocal objective are stored in a memory from which sequences thereof are concurrently read out to respective drive means with the aid of control means having input connections to a source of zooming signals and, advantageously, also to a source of focusing signals. The focusing signals may be fed to a separate drive for another component of the objective, such as a front lens, or may be used to switch the readout among different sets of correlated positional data stored in the memory. The data read out from the memory can also be used, pursuant to a further feature of my invention, for the adjustment of a diaphragm in order to take into account the variations in luminosity occurring along the zoom range.

BRIEF DESCRIPTION OF THE DRAWING

The above and other features of my present invention will now be described in detail with reference to the accompanying drawing in which:

FIG. 3 is a block diagram similar to FIG. 2, illustrating a modification;

FIG. 4 is a view similar to FIG. 1 of another optical zooming system according to the invention;

FIG. 5 shows details of a control unit included in the system of FIGS. 1–3; and

Specific Description

Figure 1:
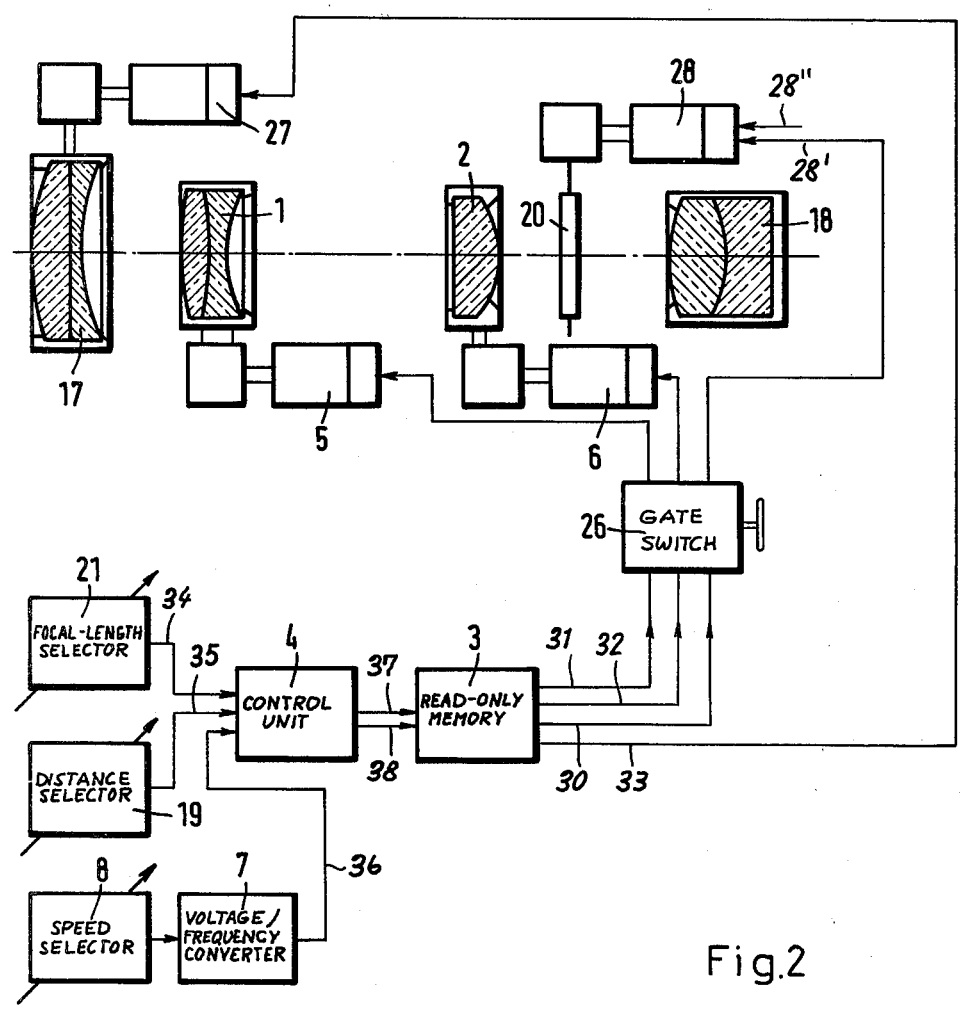
FIG. 1 is a diagrammatic overall view of an optical zooming system according to my invention.

In FIG. 1 I have illustrated a conventional varifocal objective with a positive front component 17, an axially shiftable negative component or variator 1, an axially shiftable negative component or compensator 2, and a fixed positive rear component 18 which may be part of a larger group of fixed lens members not further illustrated. An iris diaphragm 20 is inserted between components 2 and 18.

Shiftable components 1 and 2 are provided with respective electromechanical driving units 5 and 6; a similar driving unit 27 serves for a limited axial adjustment of front component 17 in order to focus the objective upon objects at different distances from component 17. Driving units 27, 5 and 6 are individually energizable by setting voltages appearing on output leads 33, 31 and 32 of a read-only memory 3 which can be preprogrammed or selectively masked to provide a predetermined correlation between the voltages appearing at any one time on leads 31 and 32. Diaphragm 20 is adjustable by a driving unit 28 energizable by memory 3 via another output lead 30. Memory 3 is addressed by a control unit 4 to which signals are fed on respective input leads 34, 35 and 36 from a focal-length selector 21, a distance selector 19 and a speed selector 8 which may be manually operated. The selectors may be potentiometers producing variable d-c voltages; in the case of speed selector 8, that d-c voltage is fed to a voltage/frequency converter 7 emitting a train of stepping pulses of variable repetition frequency or cadence.

The voltage on lead 34 establishes the position within the zoom range to which the objective is to be adjusted at a speed determined by the cadence of the stepping pulses on lead 36. Independently thereof, the voltage on lead 35 gives the displacement of front component 17 in order to focus the objective upon a desired object. Focal length, object distance and zooming speed may be indicated by suitable markings on the corresponding selectors.

Control unit 4 has two outputs 37 and 38 respectively addressing the zooming section and the focusing section of memory 3. Output leads 30, 31 and 32 extend from the zooming section whereas lead 33 originates at the focusing section. Leads 30-32 pass through a gate switch 26 which can be manually opened, upon attainment of a desired overall focal length, to halt the shifting of components 1 and 2 as well as the concomitant adjustment of diaphragm 20 regardless of the actual setting of selector 21. Lead 30 terminates at an input 28' of diaphragm drive 28 which also has another input 28" for changing the diaphragm aperture; input 28" may be energized manually, or automatically from a photometer. The setting signals from the two inputs are added electrically or mechanically, e.g. via a differential gearing.

Figure 2:
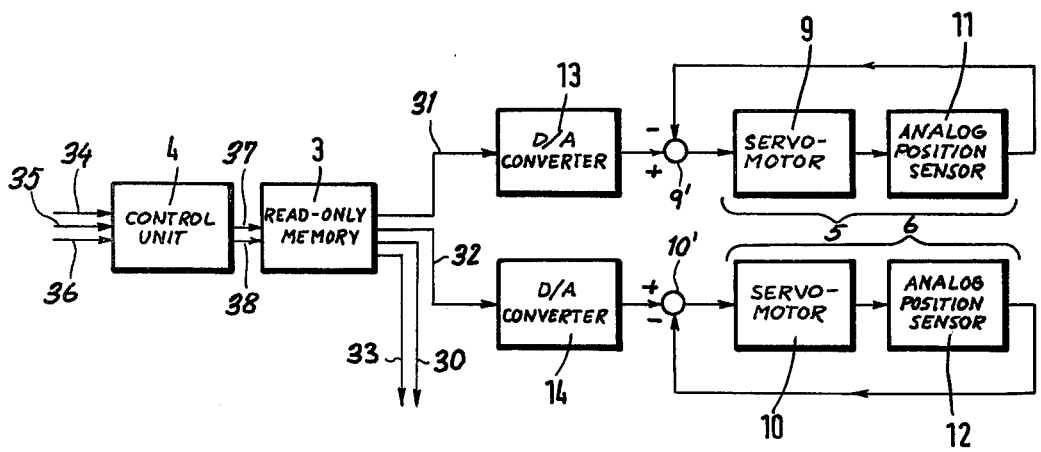
FIG. 2 is a block diagram of an assembly of the control and drive units forming part of the system of FIG. 1.

As shown in FIG. 2, the variator drive 5 and the compensator drive 6 comprise respective servomotors 9 and 10 provided with position sensors 11 and 12 which in this instance are of the analog type. The output signals of sensors 11 and 12 are fed back to the inputs of the associated servomotors by way of respective differential amplifiers 9' and 10' also receiving the signals on leads 31 and 32, read out in digital form from memory 3, via respective digital/analog converters 13, 14. Thus, the two servomotors operate in a forward or reverse direction until their input signals match the feedback signals from the position sensors. The driving units 27 and 28 for front component 17 and diaphragm 20, not shown in FIG. 2, may be similarly constituted.

In FIG. 3 the servomotors 9 and 10 work into digital position sensors 15 and 16, thus obviating the need for digital/analog converters 13 and 14.

The system of FIG. 4 differs from that of FIG. 1 in that the front component 17 of the varifocal objective is axially fixed and focusing is carried out by a supplemental shift of compensator 2 through a modification of the setting signals read out to driving unit 6 from memory 3. A modified control unit 45 is used for this purpose to address the memory 3, in response to selector signals on leads 34-36, via connections 37' and 37" commanding the readout of certain positional data stored in the memory. Output leads 31 and 32 have branches addressing a further data store 24 for the readout of digital setting signals into a digital/analog converter 25 working into the input 28' of diaphragm drive 28.

Reference will now be made to FIG. 5 for details of the control unit 4 shown in FIGS. 1-3. That unit comprises a reversible pulse counter 39 which receives the stepping pulses on input lead 36 and energizes an output lead 40 with a voltage proportional to its count. Leads 34 and 40 extend to respective inputs of a comparator 41 whose output directs the incoming stepping pulses, via an electronic switch 42, to a forward-counting or a backward-counting input of counter 39 depending on the relative polarity of the voltages on these leads. When the two voltages are equal, counter 39 is stopped.

The output voltage of the counter is also applied to a switching input of a multiplexer 43 for directing a reading voltage V to any one of a number of leads forming part of a multiple which constitutes the output 37 of unit 4. Another multiplexer 44 is switched by the setting signal on lead 35 to energize one of several leads in a multiple constituting the other output 38. Each lead of multiple 37 has three branches terminating at homologous address inputs of respective sections of memory 3, i.e., a first section delivering the setting voltage for driving unit 5 on lead 31, a second section delivering the setting voltage for driving unit 6 on lead 32 and a third section delivering the setting voltage for driving unit 28 on lead 30. The leads of multiple 38 extend to respective address inputs of a fourth memory section from which the setting voltages from driving unit 27 are read out on lead 33. Thus, with gate switch 26 (FIG. 1) closed, a given signal voltage on lead 34 will establish the selected focal-length setting and a corresponding diaphragm adjustment in successive increments determined by the stepping pulses on lead 36 whose cadence may be so chosen, for example, that the entire zoom range is traversed in a time period varying from 1 second to 10 minutes.

Figure 6:
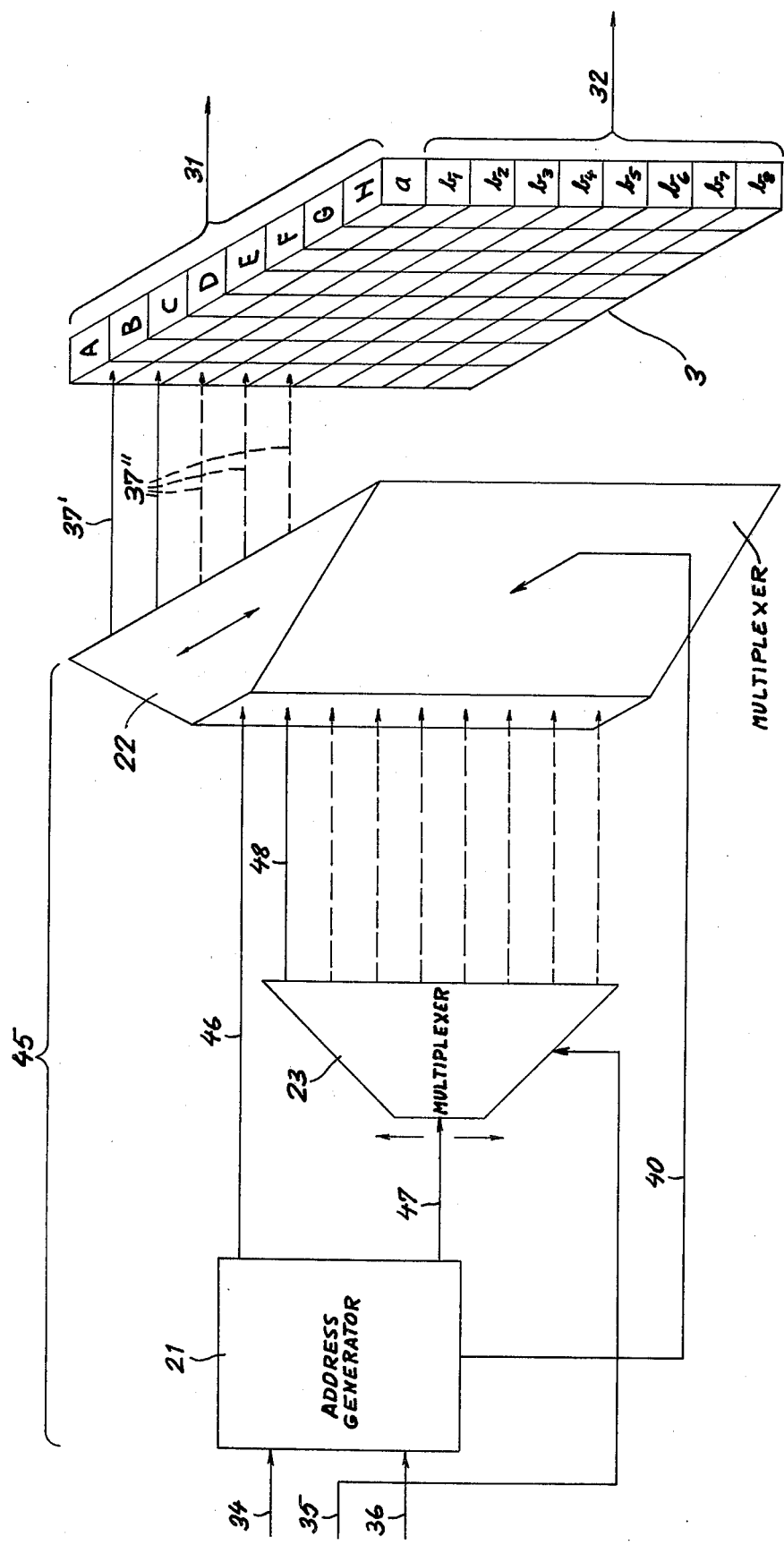
FIG. 6 shows details of a control unit and a memory included in the system of FIG. 4.

FIG. 6 shows a possible layout of the modified control unit 45 of FIG. 4 together with that of memory 3 which in this instance is divided into a multiplicity of cells forming an orthogonal array with columns A-H and rows a, $b_1$-$b_8$; the number of columns or rows in the array can of course be different from that shown. The cells of the top row a contain the positional data for variator 1, to be read out on lead 31; the cells of any one row $b_1$-$b_8$ contain the positional data, applicable to a given object distance, for compensator 2 which are to be read out on lead 32.

An address generator 21 in unit 45, which may comprise the pulse counter 39, the comparator 41 and the electronic switch 42 of FIG. 5, has its output lead 40 connected to a switching input of a multiplexer 22 having output multiples 37' and 37", only one lead of multiple 37' and a few leads of multiple 37" having been shown for the sake of clarity. Reading voltage appearing on an output lead 46 of address generator 21 is fed to multiplexer 22 in order to address one of the cells of top row a of memory 3 as selected by the voltage on lead 40. Another output lead 47 of address generator 21 applies reading voltage to a second multiplexer 23 whose output multiple 48 scans the rows $b_1$-$b_8$ of memory 3, under the control of focusing voltage on lead 35, through the intermediary of multiplexer 22. Thus, if multiplexer 22 receives on lead 40 a voltage corresponding to column A of memory 3, cell A/a will be addressed by the illustrated lead 37' together with one of the other cells in column A, depending on which of the illustrated leads 37" is energized in response to the voltage on lead 35. If the energization of lead 40 changes, two memory cells in another column will be jointly addressed to set the variator 1 and the compensator 2 in a correlated manner determined by the selected focal length and object distance.

For the sake of low cost and high dependability, the several memory cells are preferably designed as semiconductors.

I claim:

1. In an optical zooming system wherein a varifocal objective has a plurality of components including an axially shiftable variator for changing its focal length and an axially shiftable compensator for maintaining a constant image plane, the combination therewith of:

first drive means for axially shifting said variator;

second drive means for axially shifting said compensator;

memory means storing correlated positional data for said variator and said compensator;

a source of zooming signals; and control means connected to said memory means and to said source for concurrently reading out respective sequences of said correlated positional data to said first and second drive means in response to said zooming signals whereby said variator and said compensator are axially shifted between different positions in a zoom range.

2. The combination defined in claim 1 wherein said control means includes a generator of stepping signals establishing a variable readout rate for said positional data to facilitate selection of different zooming speeds.

3. The combination defined in claim 2 wherein said generator comprises a voltage/frequency converter.

4. The combination defined in claim 1 wherein said objective is provided with focusing means for displacing another component thereof in response to distance data stored in said memory means, further comprising a source of focusing signals connected to said control means for the readout of said distance data to said focusing means.

5. The combination defined in claim 1 wherein said objective is provided with a diaphragm and with adjusting means for changing the diaphragm aperture, said memory means having an output connected to said adjusting means for automatically modifying said diaphragm aperture concurrently with a shifting of said variator and said compensator.

6. The combination defined in claim 1 wherein said control means is provided with separate inputs respectively connected to said source of zooming signals and to a source of focusing signals, said memory means containing different sets of correlated positional data selectable by said focusing signals for readout in response to said zooming signals.

7. The combination defined in claim 1 wherein said first and second drive means comprise each a servomotor coupled with the respective shiftable component, a sensor determining the instantaneous position of said respective component and feedback means for signaling said instantaneous position to said servomotor.

8. The combination defined in claim 7 wherein said positional data are stored in said memory means in digital form, said sensor being an emitter of digital signals.

9. The combination defined in claim 7 wherein said positional data are stored in said memory means in digital form, further comprising digital/analog conversion means inserted between said memory means and said servomotor, said sensor being an emitter of analog signals.

10. The combination defined in claim 1, further comprising switch means inserted between said memory means and said first and second drive means for halting the shifting of said variator and said compensator independently of said zooming signals.

* * * * *